No. 730,337. PATENTED JUNE 9, 1903.
M. BONNEFONT.
NURSING BOTTLE.
APPLICATION FILED OCT. 4, 1901.
NO MODEL.
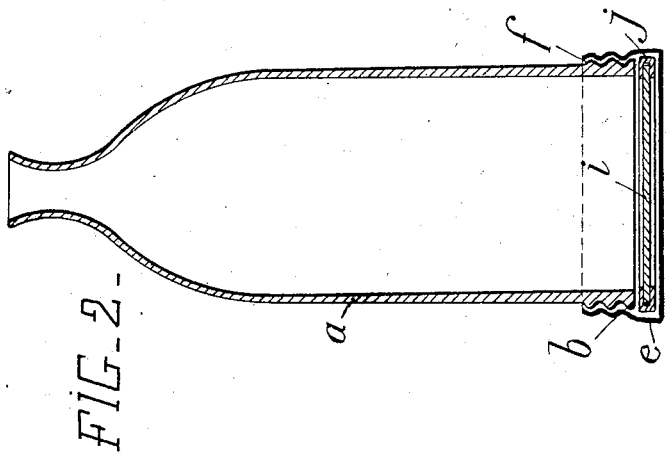
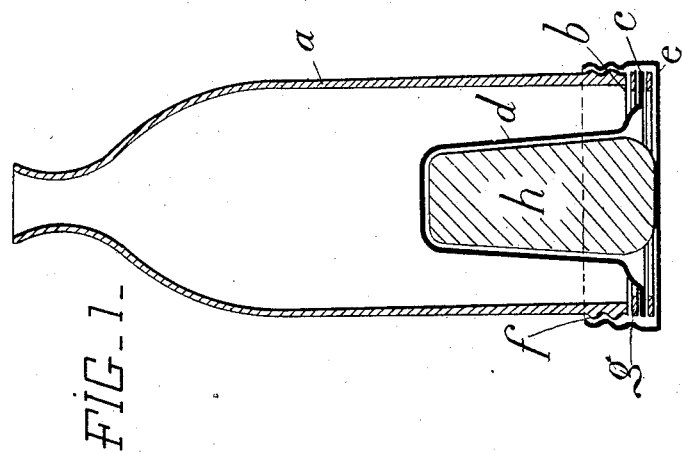
Witnesses
Edwin D Bartlett
Leonard E Haynes
Inventor
Martin Bonnefont
per Herbert Sefton Jones
Attorney No. 730,337. Patented June 9, 1903.

UNITED STATES PATENT OFFICE.

MARTIN BONNEFONT, OF PARIS, FRANCE.

NURSING-BOTTLE.

SPECIFICATION forming part of Letters Patent No. 730,337, dated June 9, 1903.

Application filed October 4, 1901. Serial No. 77,591. (No model.)

*To all whom it may concern:*

Be it known that I, MARTIN BONNEFONT, a citizen of the Republic of France, residing at No. 29 Rue de l'Echiquier, Paris, France, have invented a new and useful Improvement in Nursing-Bottles, of which the following is a specification.

The present invention relates to improvements in feeding-bottles for the purpose of keeping the milk contained warm for several hours and also for facilitating the cleansing of the bottle.

The receptacles hitherto employed as feeding-bottles have a fixed bottom, which is very difficult of access, even with the special bottle-brushes employed for the purpose of cleaning it. It therefore results that the cleaning is almost necessarily imperfect, which in the opinion of all doctors constitutes a grave danger to the health of young infants.

My improvements consist, essentially, in rendering the bottom of the bottle removable and in constructing this bottom, as also the rim of the bottle to which it attaches, without any groove or neck, &c., likely to collect and retain impurities or to put any difficulty in the way of cleaning it. Furthermore, the removability and construction of the bottom allow of forming inside the feeding-bottle a chamber in which a block of previously-heated stone can be inserted, which will maintain the temperature of the milk for a very long time.

The feeding-bottle is closed by a stopper or metal ring screwing onto a spiral grooving outside the bottom of the feeding-bottle.

In the accompanying drawings, Figure 1 is a vertical section of the feeding-bottle with heater. Fig. 2 is a similar section, the internal reservoir being removed with a view to its use merely as a hygienic feeding-bottle.

The feeding-bottle consists of a glass receptacle $a$, entirely open at the bottom and having at its lower rim no inside projection, groove, or the like. Against the edge $b$ of the side is placed the flange $c$ of a metal chamber $d$, which passes into the interior of the feeding-bottle and is closed by a metal stopper $e$, which screws onto a spiral grooving $f$ on the outside of the bottom of the feeding-bottle. A rubber washer $g$ is inserted between the bottom of the bottle and the edge of the chamber. It suffices, therefore, to give the stopper $e$ two or three turns to assure perfect water-tightness. A stone block $h$ is preferably placed in the chamber $d$, which block is preferably composed of spar and earthenware, and having been previously heated will maintain the temperature of the feeding-bottle for several hours.

It will be seen that by simply taking off the stopper $e$ all the parts come apart of themselves and that owing to their form and arrangement they are well adapted for the perfect cleansing necessitated by antiseptic principles. Of course the block $h$ can be replaced by hot water or by any substance capable of preserving heat for a longer or shorted period of time.

If it is not considered desirable to use the internal reservoir $d$, the rest of the invention constitutes a hygienic feeding-bottle with removable bottom for the purpose specified above, which can be used alone. In this case a glass disk $i$, provided with rubber $j$ on its periphery, is inserted between the open bottom of the bottle and the metal stopper $e$.

What I claim is—

1. In a nursing-bottle, the combination with the principal receptacle containing the milk, of a movable bottom and an internal chamber devised to contain hot water or other heated substance for the purpose of maintaining the temperature of the milk, the said nursing-bottle being closed underneath by the edges of the interior receptacle and this latter being closed in its turn by the screw-bottom of the nursing-bottle, substantially as set forth.

2. In a nursing-bottle, a detachable bottom, a screw threading upon the inner rim of said bottom, a corresponding screw threading upon the outer lower part of the bottle-wall, a removable vessel having a projecting rim adapted to be held water-tight between the screw-bottom of the bottle and the lower part of the bottle-wall, and a heating substance in said vessel.

In testimony whereof I have signed my name to this specification in the presence of two subscribing witnesses.

MARTIN BONNEFONT.

Witnesses:
JEAN E. D. NOIS DE LA COCHETIARY,
J. ALLISON BOWEN.